(12) United States Patent
Nishijima

(10) Patent No.: US 12,166,305 B2
(45) Date of Patent: Dec. 10, 2024

(54) FEMALE TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 338 days.

(21) Appl. No.: 17/790,906

(22) PCT Filed: Dec. 25, 2020

(86) PCT No.: PCT/JP2020/048670
§ 371 (c)(1),
(2) Date: Jul. 5, 2022

(87) PCT Pub. No.: WO2021/145197
PCT Pub. Date: Jul. 22, 2021

(65) Prior Publication Data
US 2023/0077448 A1    Mar. 16, 2023

(30) Foreign Application Priority Data

Jan. 15, 2020  (JP) .................................. 2020-004582
May 19, 2020  (JP) .................................. 2020-087255

(51) Int. Cl.
*H01R 13/187* (2006.01)

(52) U.S. Cl.
CPC .................................. *H01R 13/187* (2013.01)

(58) Field of Classification Search
None
See application file for complete search history.

(56) References Cited

U.S. PATENT DOCUMENTS

| 2010/0124857 A1 | 5/2010 | Kawamura et al. |
| 2012/0129407 A1 | 5/2012 | Glick et al. |

(Continued)

FOREIGN PATENT DOCUMENTS

| CN | 104347994 A | * 2/2015 | ............. H01R 13/11 |
| JP | S62-157076 U1 | 10/1987 | |

(Continued)

OTHER PUBLICATIONS

International Search Report issued on Mar. 16, 2021 for WO 2021/145197 A1 (4 pages).

*Primary Examiner* — Tho D Ta
(74) *Attorney, Agent, or Firm* — Venjuris, P.C.

(57) ABSTRACT

A female terminal is provided with a pair of connecting portions arranged to face each other across a male terminal insertion gap, a spring member held on the pair of connecting portions while sandwiching the pair of connecting portions and configured to bias the pair of connecting portions in mutually approaching directions along a facing direction, and a stopper protrusion projecting on at least one of the pair of connecting portions and configured to come into contact with the other of the pair of connecting portions to hold the male terminal insertion gap by restricting displacements of the pair of connecting portions in the approaching directions. Displacements in separating directions of the pair of connecting portions are allowed against a biasing force of the spring member, whereby a male (Continued)

terminal is press-fit into the male terminal insertion gap and disposed between the pair of connecting portions.

3 Claims, 12 Drawing Sheets

(56) References Cited

U.S. PATENT DOCUMENTS

2020/0403342 A1  12/2020  Nishijima
2023/0420877 A1* 12/2023  Nishijima ............ H01R 13/113

FOREIGN PATENT DOCUMENTS

JP      2011-238558 A     11/2011
WO   WO-2014021403 A1 *  2/2014  ........... H01R 13/113

* cited by examiner

FEMALE TERMINAL

CROSS REFERENCE TO RELATED APPLICATIONS

This application is a national phase of PCT application No. PCT/JP2020/048670, filed on 25 Dec. 2020, which claims priority from Japanese patent application Nos. 2020-004582 and 2020-087255 filed on 15 Jan. 2020 and 19 May 2020, respectively, all of which are incorporated herein by reference.

TECHNICAL FIELD

The present disclosure relates to a female terminal and particularly to a female terminal conductively connectable to a male terminal with a large contact pressure.

BACKGROUND

Conventionally, a female terminal for high voltage used, for example, in a hybrid or electric vehicle is required to be brought into contact with a male terminal with a large contact pressure for the purpose of stably conducting a large current. For example, in Patent Document 1, a structure is proposed in which a pressing portion for pressing a male terminal is arranged to face a connecting portion of a female terminal across a gap, the pressing portion is biased toward the connecting portion using a coil spring accommodated in a case mounted on the female terminal and the male terminal is pressed against the connecting portion of the female terminal with a high pressure by the pressing portion.

PRIOR ART DOCUMENT

Patent Document

Patent Document 1: JP 2019-153565 A

SUMMARY OF THE INVENTION

Problems to be Solved

In the female terminal described in Patent Document 1, the male terminal and the connecting portion of the female terminal are electrically connected with a large contact pressure, but the pressing portion, the coil spring and, further, the case for positioning and holding the coil spring and the pressing portion need to be mounted on the connecting portion of the female terminal and cost tends to increase due to an increase in the number of components. Further, a plate thickness of the connecting portion of the female terminal has to be increased to allow a large current to be conducted, whereby the processability of the connecting portion has tended to be reduced.

Accordingly, it is aimed to disclose a female terminal of a novel structure capable of ensuring a large contact pressure between male and female terminals with a smaller number of components and improving the processability of a connecting portion.

Means to Solve the Problem

The present disclosure is directed to a female terminal with a pair of connecting portions arranged to face each other across a male terminal insertion gap, a spring member held on the pair of connecting portions while sandwiching the pair of connecting portions, the spring member biasing the pair of connecting portions in mutually approaching directions along a facing direction, and a stopper protrusion projecting on at least one of the pair of connecting portions, the stopper protrusion coming into contact with the other of the pair of connecting portions to hold the male terminal insertion gap by restricting displacements of the pair of connecting portions in the approaching directions, wherein displacements in separating directions of the pair of connecting portions are allowed against a biasing force of the spring member, whereby a male terminal is press-fit into the male terminal insertion gap and disposed between the pair of connecting portions.

Effect of the Invention

According to the present disclosure, it is possible to provide a female terminal capable of ensuring a large contact pressure between male and female terminals with a smaller number of components and improving the processability of a connecting portion.

DETAILED DESCRIPTION TO EXECUTE THE INVENTION

Description of Embodiments of Present Disclosure

Figure 1:
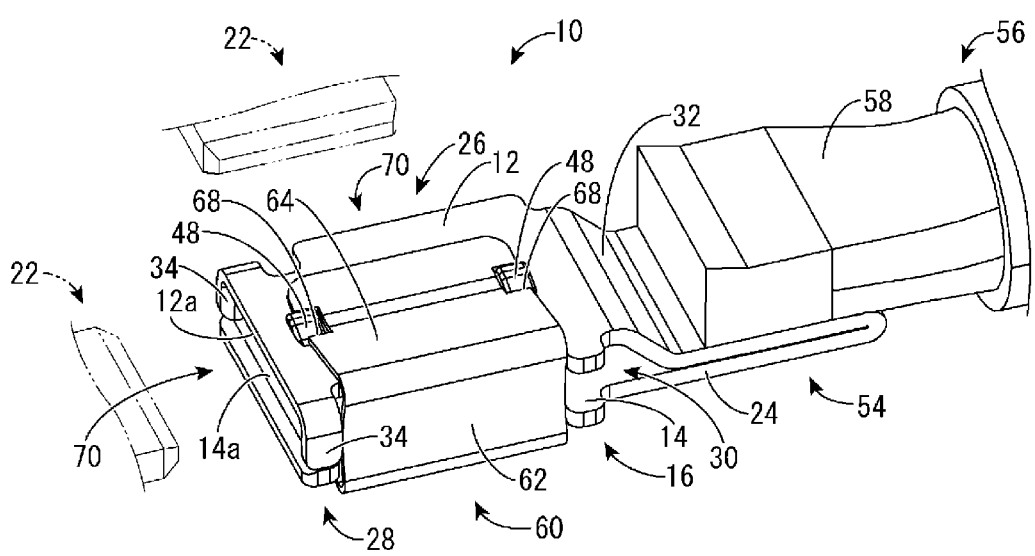
FIG. 1 is an overall perspective view showing a female terminal according to a first embodiment of the present disclosure.
Figure 1:
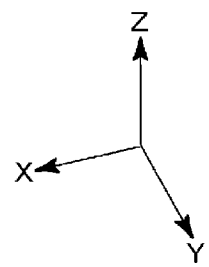

First, embodiments of the present disclosure are listed and described.

(1) The female terminal of the present disclosure is provided with a pair of connecting portions arranged to face each other across a male terminal insertion gap, a spring member held on the pair of connecting portions while sandwiching the pair of connecting portions, the spring member biasing the pair of connecting portions in mutually approaching directions along a facing direction, and a stopper protrusion projecting on at least one of the pair of connecting portions, the stopper protrusion coming into contact with the other of the pair of connecting portions to hold the male terminal insertion gap by restricting displacements of the pair of connecting portions in the approaching directions, wherein displacements in separating directions of the pair of connecting portions are allowed against a biasing force of the spring member, whereby a male terminal is press-fit into the male terminal insertion gap and disposed between the pair of connecting portions.

According to the female terminal of the present disclosure, the female terminal includes the pair of connecting portions arranged to face each other across the male terminal insertion gap, and the spring member for biasing the pair of connecting portions in the mutually approaching directions along the facing direction is held on the pair of connecting portions while sandwiching the pair of connecting portions. In this way, the pair of connecting portions can be pressed with a large contact pressure against the male terminal press-fit into the male terminal insertion gap while being sandwiched by the spring member by causing the pair of connecting portions to separate and displace against the biasing force of the spring member. Although the case for accommodating the pressing portion and the coil spring is necessary to press the connecting portion of the female terminal against the male terminal in the conventional structure, those components can be made unnecessary, the number of components can be drastically reduced and assemblability can be improved.

In addition, since the connecting portions to be pressed into contact with the male terminal are constituted by the pair of connecting portions pressed from both sides of the male terminal, a current of a required value can be shunted to the pair of connecting portions. Therefore, a plate thickness of the connecting portions required to enable the current of the required value to conduct can be reduced as compared to a connecting portion constituted by a single flat plate as in the conventional structure. As a result, a degree of freedom in the processability and plating of the connecting portion can be improved.

Furthermore, the stopper protrusion for holding the male terminal insertion gap by restricting displacements of the pair of connecting portions in the approaching directions is provided to project from at least one of the pair of connecting portions toward the other, and approaching displacements are restricted by the contact of the stopper protrusion with the other connecting portion. Therefore, the case for restricting an approaching displacement of the pressing portion toward the connecting portion can be made unnecessary in the conventional structure, and the structure can be further simplified.

Note that any spring member may be adopted as long as the spring member is held on the pair of connecting portions while sandwiching the pair of connecting portions, and any of a clip spring, a ring-shaped resilient member such as a rubber band and the like can be adopted as the spring member.

(2) Preferably, the spring member is constituted by a clip spring including a coupling plate portion in the form of a rectangular flat plate and a pair of sandwiching plate portions in the form of rectangular flat plates projecting in mutually approaching directions from both side edge parts of the coupling plate portion and the pair of connecting portions are sandwiched between the pair of sandwiching plate portions of the clip spring, and male terminal insertion openings communicating with the male terminal insertion gap are provided on a side facing the coupling plate portion of the clip spring and on the side of side edge parts of the pair of sandwiching plate portions of the clip spring. This is because a structure to be held on the pair of connecting portions while sandwiching the pair of connecting portions can be advantageously realized by adopting the clip spring as the spring member. Further, the male terminal insertion openings can be set on the side facing the coupling plate portion of the clip spring and on the side of the side edge parts of the pair of sandwiching plate portions of the clip spring. In this way, the male terminal can be inserted into the female terminal from a plurality of directions, and the versatility of the female terminal can be improved.

(3) Preferably, in (2) described above, projections provided on at least one of each sandwiching plate portion and each connecting portion are fit to recesses provided in the others, whereby the clip spring is held on the pair of connecting portions. This is because the clip spring can be more stably held on the pair of connecting portions by fitting the recesses and the projections provided on the sandwiching plate portions of the clip spring and the connecting portions.

(4) Preferably, the female terminal is provided with a dome-like contact portion provided on a facing surface of one of the pair of connecting portions and projecting toward the other connecting portion and a pair of linear contact portions provided on a facing surface of the other of the pair of connecting portions and projecting toward the one connecting portion, the pair of linear contact portions being arranged on both sides across the dome-like contact portion. This is because the female terminal can be brought into contact with the male terminal over a wide contact area since the dome-like contact portion projects on the facing surface of the one of the pair of connecting portions. Further, since the pair of linear contact portions projecting on the facing surface of the other of the pair of connecting portions are arranged on the both sides across the dome-like contact portion, the male terminal can be supported on three points between the pair of connecting portions to be brought into contact with both sides of the male terminal, and a stable contact state between the male and female terminals can be advantageously maintained by suppressing the rattling of the male terminal.

(5) Preferably, the pair of connecting portions are divided into a plurality of pairs of divided connecting portions, the spring member is divided into a plurality of pairs of divided sandwiching plate portions, and each pair of divided connecting portions are respectively separately biased by each pair of divided sandwiching plate portions. In this way, each pair of divided connecting portions can be displaced independently of the other pair of divided connecting portions, and the plurality of pairs of divided connecting portions constituting the pair of connecting portions can exhibit better followability for the twist of the male terminal inserted into the female terminal. Therefore, even if the male terminal is twisted, the female terminal and the male terminal can be more stably electrically connected.

(6) Preferably, in (5) described above, the spring member includes a coupling plate portion coupling base end parts of the plurality of pairs of divided sandwiching plate portions. Since the spring member includes the coupling plate portion coupling the base end parts of the plurality of pairs of divided sandwiching plate portions, the spring member can be handled as an integrated object. Therefore, workability in mounting the spring member on the connecting portions can be improved. Further, the number of components can be reduced.

(7) Preferably, in (5) or (6) described above, each pair of divided connecting portions include the stopper protrusions. Each pair of divided connecting portions include the stopper protrusions. In this way, an approaching displacement is restricted for each divided connecting portion of each pair. Therefore, even if the male terminal is twisted, the female terminal and the male terminal can be more stably electrically connected.

Details of Embodiment of Present Disclosure

Specific examples of a female terminal of the present disclosure are described below with reference to the drawings. Note that the present disclosure is not limited to these illustrations and is intended to be represented by claims and include all changes in the scope of claims and in the meaning and scope of equivalents.

First Embodiment

Hereinafter, a first embodiment of the present disclosure is described with reference to FIGS. 1 to 6. A female terminal 10 according to the first embodiment of the present disclosure is shown in FIGS. 1 to 6. The female terminal 10 includes a female terminal fitting 16 having a first connecting portion 12 and a second connecting portion 14 arranged to face each other. A pair of connecting portions to be conductively connected to a male terminal 22 in the form of a rectangular flat plate and having a tab shape with a tapered tip part are configured in the female terminal fitting 16 by the first and second connecting portions 12, 14. Here, the male terminal 22 is shown by an imaginary line to facilitate understanding. Note that, in the following description, a Z direction is referred to as an upward direction, a Y direction is referred to as a width direction and an X direction is referred to as a forward direction along a length direction. Further, for a plurality of identical members, only some members may be denoted by a reference sign and the other members may not be denoted by the reference sign.

<First Connecting Portion 12 and Second Connecting Portion 14>

As shown in FIGS. 1 to 3 and 5, the female terminal fitting 16 is formed by press-working a strip-like metal flat plate 24 into a predetermined shape. A metal having a low electrical resistance such as copper, copper alloy, aluminum or aluminum alloy can be appropriately selected as a metal for constituting the metal flat plate 24. In the first embodiment, one end part in the length direction of the strip-like metal flat plate 24 is bent into two toward another end part 28. More particularly, the one end part 26 is bent to be located above the other end part 28 and a tip side of the one end part 26 is bent upward into a crank shape, whereby the first and second connecting portions 12, 14 are arranged to face each other while keeping a fixed distance in the vertical direction. That is, the first and second connecting portions 12, 14 constituting the pair of connecting portions are arranged to face each other across a male terminal insertion gap 30. Further, the male terminal insertion gap 30 is open on both sides in the width direction (Y direction) and a front side in the length direction (X direction) in a rectangular cross-sectional shape (see FIG. 2).

A distance of the male terminal insertion gap 30 between the first and second connecting portions 12, 14 is specified by projecting dimensions in the vertical direction of a cranked bent portion 32 formed on a base end side of the first connecting portion 12 and stopper protrusions 34 in the form of rectangular flat plates formed on both widthwise sides of a tip part of the first connecting portion 12 and projecting toward the second connecting portion 14. Note that, in the female terminal 10 of the first embodiment, a clip spring 60 as a spring member for biasing the first and second connecting portions 12, 14 in approaching directions is mounted on vertically outer surfaces of the first and second connecting portions 12, 14 as described later. Thus, projecting tip parts of the stopper protrusions 34 are pressed into contact with the second connecting portion 14. That is, the stopper protrusions 34 project on the first connecting portion 12 constituting one connecting portion, and the male terminal insertion gap 30 is held by restricting displacements of the first and second connecting portions 12, 14 in the approaching directions by the contact of the stopper protrusions 34 with the second connecting portion 14 constituting the other connecting portion. By applying a force against a biasing force of the clip spring 60, the first and second connecting portions 12, 14 are allowed to be displaced in separating directions.

Figure 2:
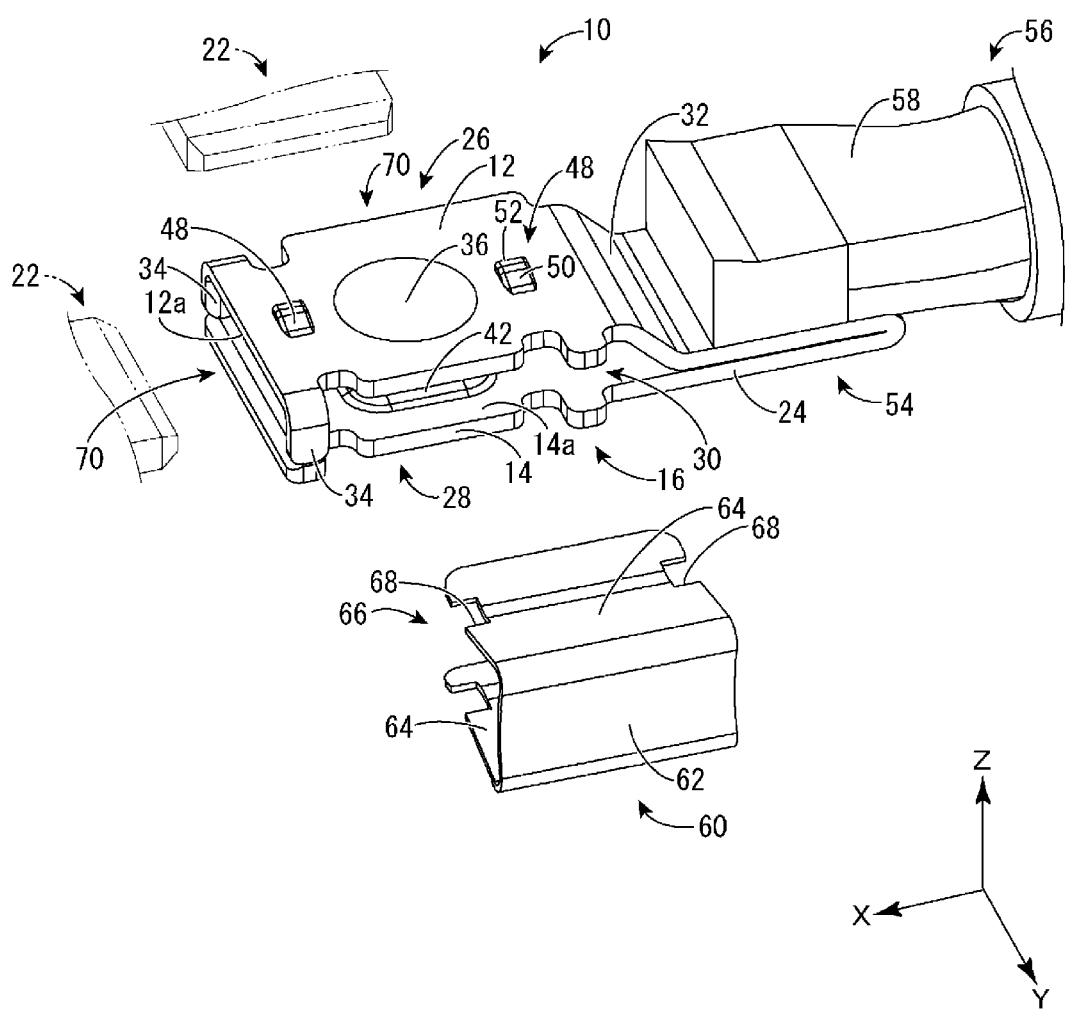
FIG. 2 is an exploded perspective view of FIG. 1.
Figure 3:
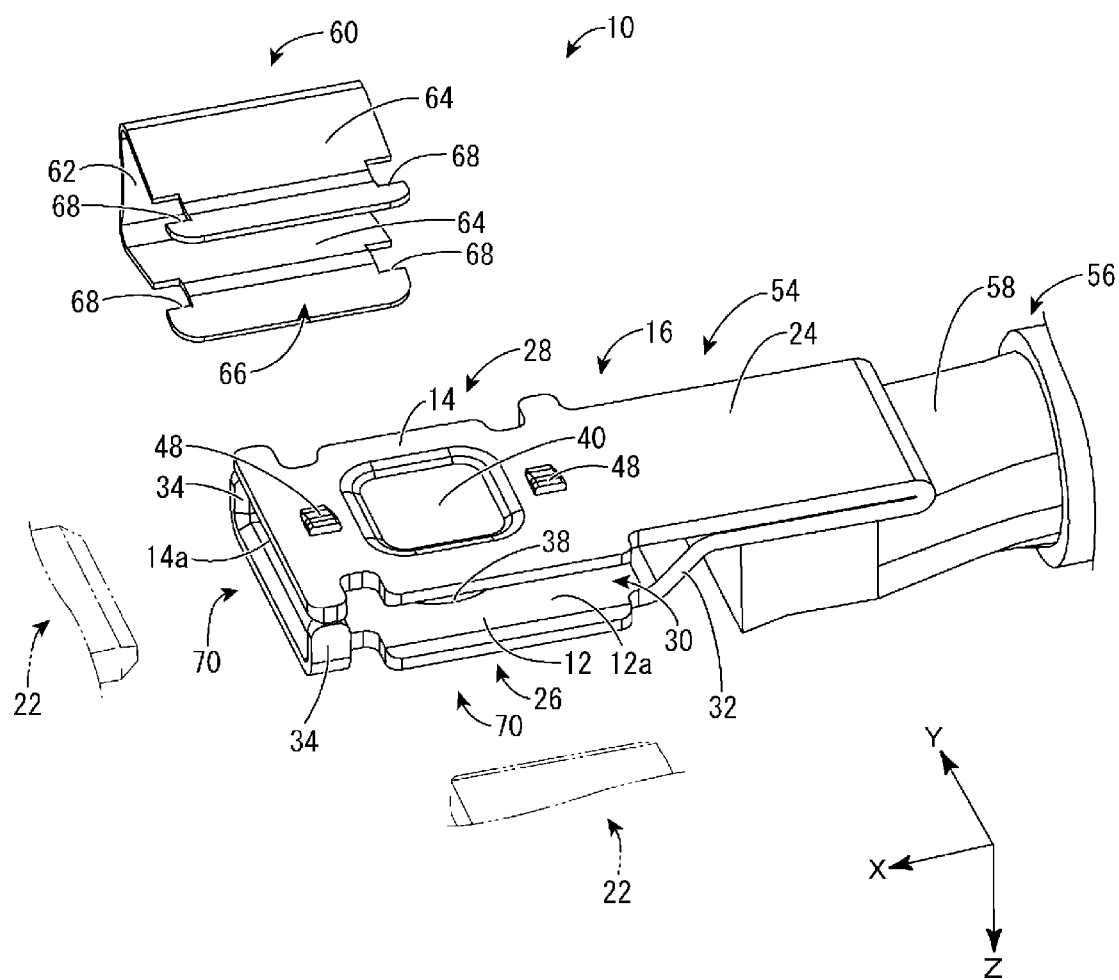
FIG. 3 is a perspective view viewed from a bottom surface of FIG. 2.
Figure 4:
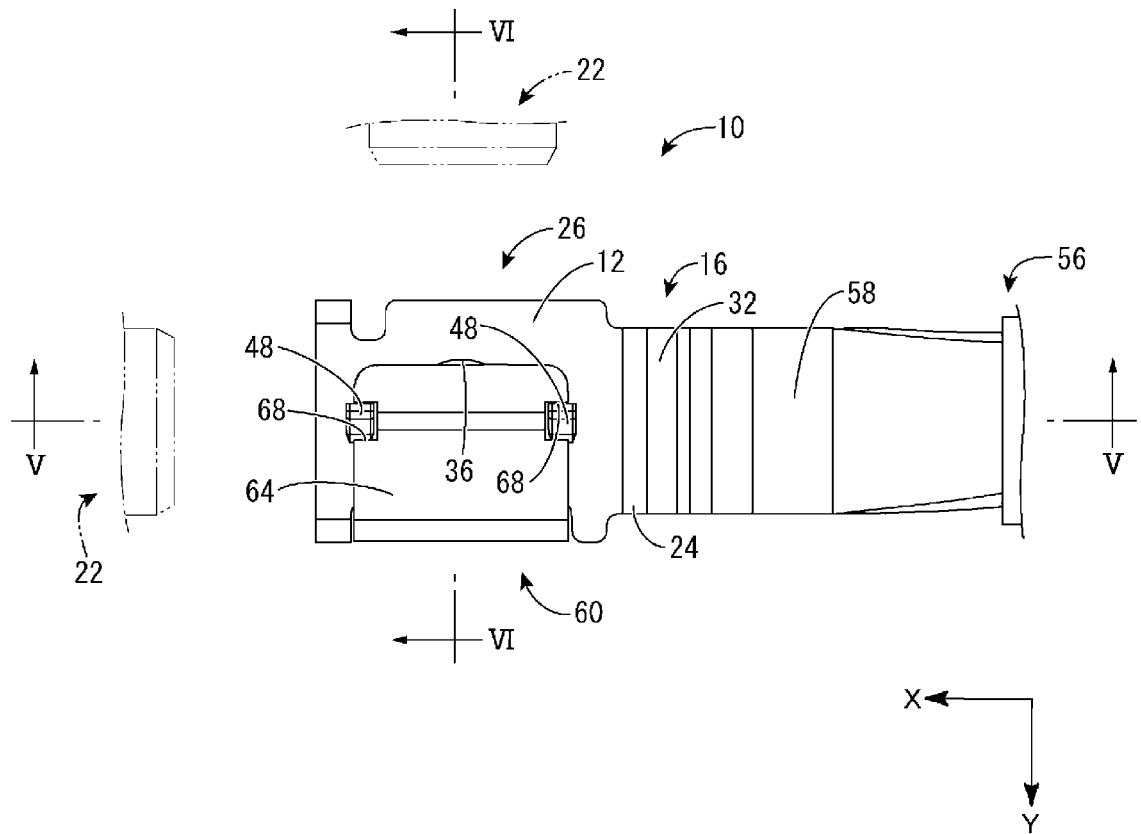
FIG. 4 is a plan view of the female terminal shown in FIG. 1.
Figure 5:
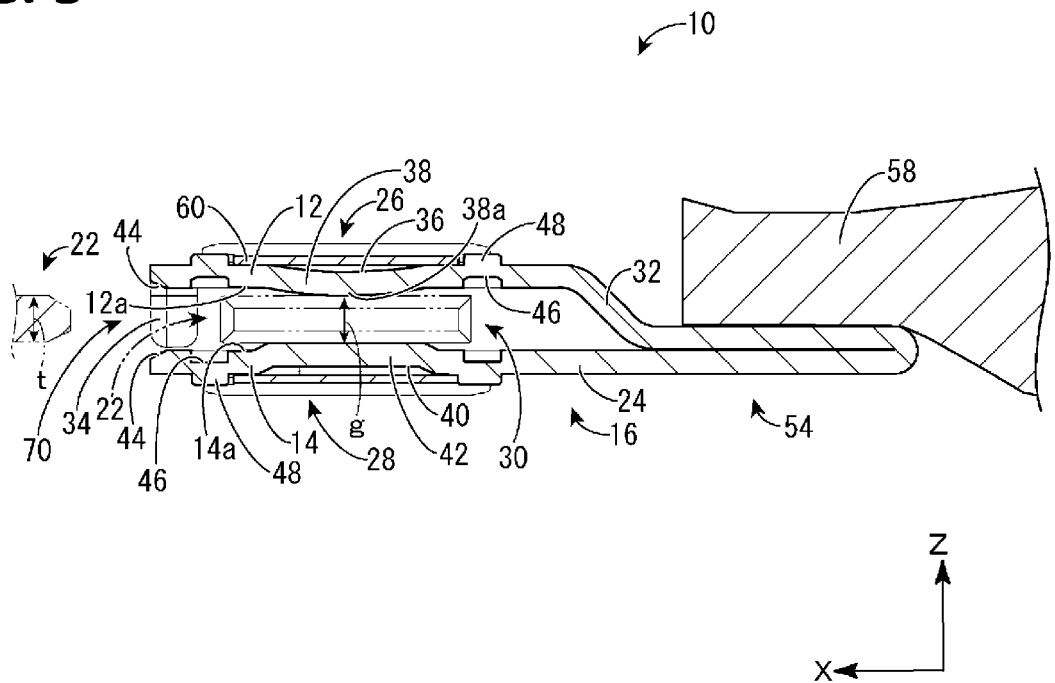
FIG. 5 is a section along V-V in FIG. 4.
Figure 6:
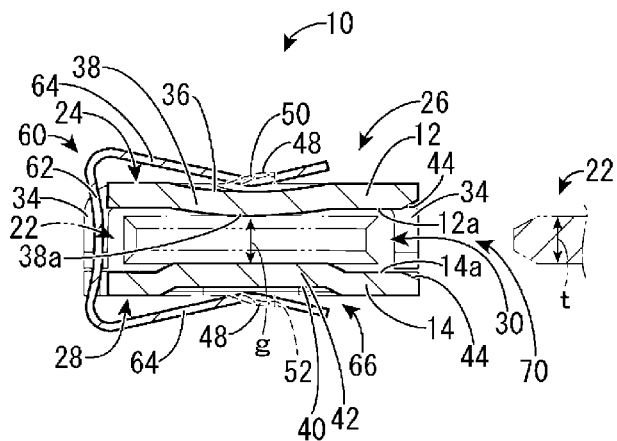
FIG. 6 is a section along VI-VI in FIG. 4.
Figure 6:
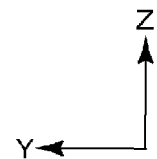

As shown in FIGS. 2, 5 and 6, a dome-like recess 36 having a circular shape in a plan view and projecting toward the second connecting portion 14 is provided in a central part of the outer surface of the first connecting portion 12. A dome-like contact portion 38 having an arcuate shape in a cross-section in the length direction (see FIG. 5) and a cross-section in the width direction (see FIG. 6) and projecting toward the second connecting portion 14 is formed on an inner surface 12a of the first connecting portion 12, which is one of facing surfaces of the first and second connecting portions 12, 14, by the recess 36. Further, as shown in FIGS. 3, 5 and 6, a recess 40 having a substantially square shape in a plan view and recessed toward the first connecting portion 12 is provided in a central part of the outer surface of the second connecting portion 14. A trapezoidal contact portion 42 having a flat trapezoidal shape in a cross-section in the length direction (see FIG. 5) and a cross-section in the width direction (see FIG. 6) and projecting toward the first connecting portion 12 is formed on an inner surface 14a of the second connecting portion 14, which is the other of the facing surfaces of the first and second connecting portions 12, 14, by the recess 40. In this way, as shown in FIGS. 5 and 6, a separation dimension g between the first and second connecting portions 12, 14 in the male terminal insertion gap 30 is slightly smaller than a thickness t of the male terminal 22 (g<t). That is, the male terminal insertion gap 30 is so configured that the male terminal 22 is press-fit thereinto. The male terminal 22 is press-fit into the male terminal insertion gap 30 and disposed between the first and second connecting portions 12, 14.

As shown in FIGS. 5 and 6, the inner surface 12a of the first connecting portion 12 and the inner surface 14a of the second connecting portion 14 in a male terminal insertion opening 70 of the male terminal insertion gap 30, into which the male terminal 22 to be described later is inserted, are formed with tapered surfaces 44 for making the separation dimension g between the first and second connecting portions 12, 14 larger, and the male terminal 22 can be easily inserted into the male terminal insertion gap 30. In addition, as shown in FIG. 5, recesses 46 having a rectangular shape are formed on both sides in the length direction (X direction) of each of the dome-like contact portion 38 and the trapezoidal contact portion 42 on the inner surface 12a of the first connecting portion 12 and the inner surface 14a of the second connecting portion 14. As shown FIGS. 2 and 3, projections 48 extending in the length direction (X direction) in a triangular cross-sectional shape are formed on the outer surfaces of the first and second connecting portions 12, 14. As shown in FIGS. 2 and 5, a surface of the projection 48 on one side in the width direction (Y direction), on which the clip spring 60 to be described later is mounted, is formed into a tapered surface 50, and a surface thereof on the other side in the width direction (Y direction) is formed into an engaging surface 52 extending in the vertical direction. That is, the clip spring 60 can be easily mounted and engaged with the projections 48 by the tapered surfaces 50 and, after the engagement, the clip spring 60 is advantageously prevented from being disengaged from the projections 48 by the engaging surfaces 52.

<Wire Connecting Portion 54>

As shown in FIG. 1, by bending the strip-like metal flat plate 24 into two such that the one end part 26 in the length direction is located above the other end part 28, parts of the metal flat plate 24 are overlapped each other in a central part in the length direction of the metal flat plate 24 and fixed and integrated to each other using a known arbitrary means such as resistance welding, whereby the wire connecting portion 54 is configured. In this way, the female terminal fitting 16 constituting the female terminal 10 can be conductively connected to a core wire 58 of a wire 56 in the wire connecting portion 54. Note that workability can be made more efficient by simultaneously fixing the core wire 58 of the wire 56 to the wire connecting portion 54.

<Clip Spring 60>

As shown in FIG. 1, the clip spring 60 for biasing the first and second connecting portions in the approaching directions is mounted on the vertically outer surfaces of the first and second connecting portions 12, 14. The clip spring 60 is formed, using one of strip plates of various metal materials, which can be press-worked or stamped, such as spring steel, stainless steel, brass, phosphor bronze and beryllium. The clip spring 60 includes a coupling plate portion 62 in the form of a rectangular plate and a pair of sandwiching plate portions 64, 64 in the form of rectangular plates projecting in mutually approaching directions from both side edge parts of the coupling plate portion 62. Projecting end parts of the pair of sandwiching plate portions 64, 64 are slightly bent in mutually separating directions. A gap between the closest projecting end parts in the pair of sandwiching plate portions 64, 64 serves as an insertion opening 66. Recesses 68 having a rectangular cross-sectional shape and open in end edge parts are provided to penetrate through the pair of sandwiching plate portions 64, 64 in a plate thickness direction on both end edge parts of the insertion opening 66.

The clip spring 60 is mounted on the first and second connecting portions 12, 14 arranged to face each other from one widthwise side (front side in FIG. 2). At this time, the pair of sandwiching plate portions 64, 64 are resiliently deformed in the mutually separating directions, whereby the clip spring 60 is allowed to be mounted on the outer surfaces of the first and second connecting portions 12, 14 in the insertion opening 66. Thereafter, the pair of sandwiching plate portions 64, 64 ride over the tapered surfaces 50 of the projections 48 provided on the outer surfaces of the first and second connecting portions 12, 14 and are resiliently restored, whereby the engaging surfaces 52 of the projections 48 provided on the first and second connecting portions 12, 14 are fit to the recesses 68 provided in the pair of sandwiching plate portions 64, 64. In this way, the clip spring 60 is held on the first and second connecting portions 12, 14 with the first and second connecting portions 12, 14 sandwiched between the pair of sandwiching plate portions 64, 64 of the clip spring 60.

As shown in FIG. 1, the female terminal fitting 16 is configured such that the male terminal 22 is insertable from one side in the width direction (Y direction) and a front side in the length direction (X direction) where the clip spring 60 is not mounted, out of both sides in the width direction (Y direction) and the front side in the length direction (X direction) where the male terminal insertion gap 30 is open. That is, the male terminal insertion openings 70 communicating with the male terminal insertion gap 30 to allow the insertion of the male terminal 22 into the male terminal insertion gap 30 are provided on the one side in the width direction (Y direction) facing the coupling plate portion 62 of the clip spring 60 and the front side in the length direction (X direction), which is the side of side edge parts of the pair of sandwiching plate portions 64, 64 of the clip spring 60. As shown in FIG. 1, the male terminal insertion opening 70 on the one side in the width direction (Y direction) is open in a direction orthogonal to an extending direction of the wire 56, and the male terminal insertion opening 70 on the front side in the length direction (X direction) is open in the extending direction of the wire 56.

According to the female terminal 10 of the present disclosure structured as just described, the clip spring 60 for biasing the first and second connecting portions 12, 14 in the approaching directions is held on the first and second connecting portions 12, 14 with the first and second connecting portions 12, 14 sandwiched between the pair of sandwiching plate portions 64, 64. In this way, the male terminal 22 press-fit into the male terminal insertion gap 30 can be sandwiched with a large contact pressure between the first and second connecting portions 12, 14. Thus, as compared to the case where a case for accommodating a pressing portion and a coil spring is required for sandwiching with a large contact pressure as before, those components can be made unnecessary, whereby the number of components is drastically reduced and assemblability is improved. Further, since the pair of connecting portions are constituted by the first and second connecting portions 12, 14, the plate thickness required for each connecting portion can be reduced as compared to the case where a connecting portion is constituted by a single flat plate as before. Thus, a degree of freedom in the processability and plating of the connecting portions can be improved. Furthermore, the stopper protrusions 34 projecting on the first connecting portion 12 come into contact with the second connecting portion 14, whereby the male terminal insertion gap 30 is held by restricting displacements of the first and second connecting portions 12, 14 in the approaching directions. Thus, the case for restricting an approaching displacement of the pressing portion toward the connecting portion, which case has been conventionally required, can be made unnecessary, wherefore the female terminal 10 can be further simplified.

Further, by adopting the clip spring 60 as a spring member, a state where the first and second connecting portions 12, 14 constituting the pair of connecting portions are sandwiched can be advantageously realized. In addition, the male terminal 22 can be inserted from the one side in the width direction (Y direction) and the front side in the length direction (X direction) where the clip spring 60 is not mounted. In this way, the male terminal 22 can be inserted into the female terminal 10 from a plurality of directions (two directions in the first embodiment), and the versatility of the female terminal 10 can be improved. In addition, the engaging surfaces 52 of the projections 48 provided on the first and second connecting portions 12, 14 of the female terminal 10 are fit to the recesses 68 provided in the pair of sandwiching plate portions 64, 64 of the clip spring 60. In this way, the clip spring 60 can be more stably held on the first and second connecting portions 12, 14 of the female terminal 10.

Further, since the dome-like contact portion 38 having a dome-shaped projecting end surface projects on the inner surface 12*a* of the first connecting portion 12, which is one of the facing surfaces of the first and second connecting portions 12, 14 as shown in FIGS. 5 and 6, the female terminal 10 can be brought into contact with the male terminal 22 over a large contact area. Moreover, since the trapezoidal contact portion 42 having a trapezoidal projecting end surface projects on the inner surface 14*a* of the second connecting portion 14, which is the other of the facing surfaces of the first and second connecting portions 12, 14, the female terminal 10 can be stably brought into contact with the male terminal 22 over a large contact area.

First Modification of First Embodiment

Figure 7:
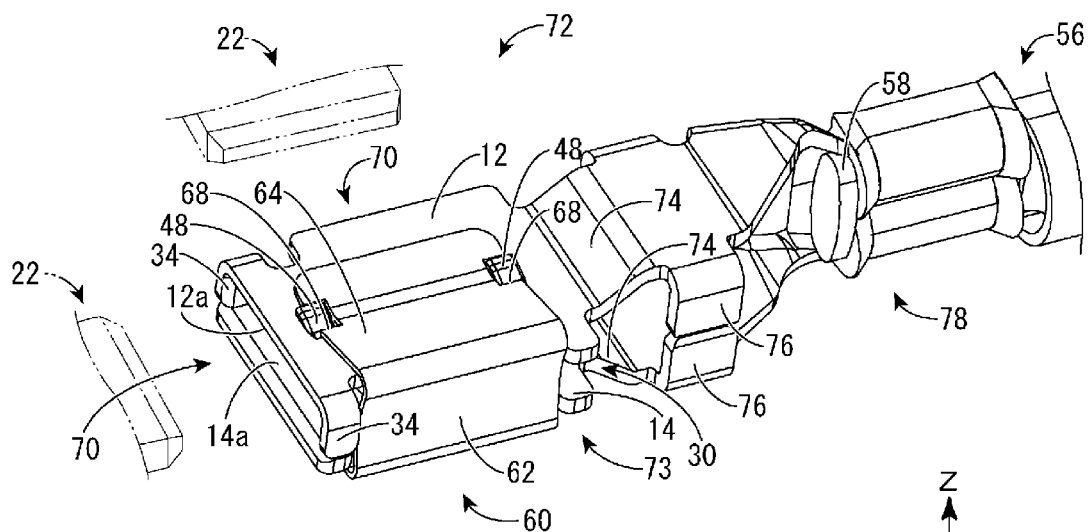
FIG. 7 is a perspective view showing a female terminal according to a first modification.
Figure 7:
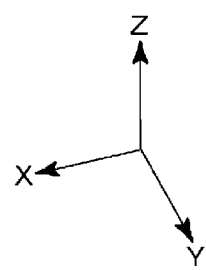
Figure 8:
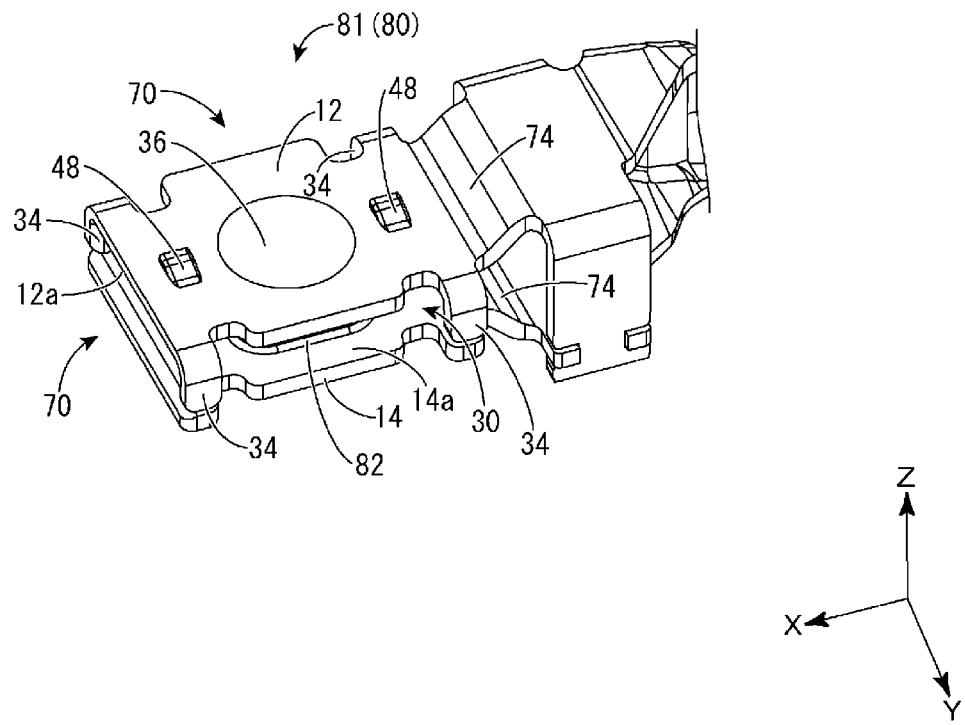
FIG. 8 is a perspective view showing a female terminal fitting of a female terminal according to a second modification.

Although the above first embodiment is described taking as an example a case where the parts of the metal flat plate 24 are overlapped each other and fixed and integrated to each other using the known arbitrary means such as resistance welding, thereby configuring the wire connecting portion 54, there is no limitation to this. The core wire 58 of the wire 56 may be connected by crimping. A first modification of the first embodiment of the present disclosure is described below with reference to FIG. 7. In a female terminal fitting 73 constituting a female terminal 72 of the first modification of the first embodiment, a pair of extending plate portions 74, 74 are provided which are connected to rear end parts of the first and second connecting portions 12, 14 and project outward (in the vertical direction in FIG. 7) while being separated from each other. Side walls 76, 76 projecting toward each other are provided on extending end parts of the pair of extending plate portions 74, 74, and the extending end parts of the side walls 76, 76 are formed into a tubular shape by the mutual contact of the side walls 76. Further, a wire crimping portion 78 is provided which is connected to the extending end parts of the pair of extending plate portions 74, 74. The wire crimping portion 78 is crimped to the core wire 58 exposed in an end of the wire 56 using a known crimping technique, whereby the core wire 58 of the wire 56 is conductively connected to the female terminal 72. The female terminal 72 of the first modification of the first embodiment of the present disclosure apparently has effects similar to those of the female terminal 10 of the first embodiment of the present disclosure since only connection to the core wire 58 of the wire 56 by fixing is changed to connection thereto by crimping.

Second Modification of First Embodiment

Figure 9:
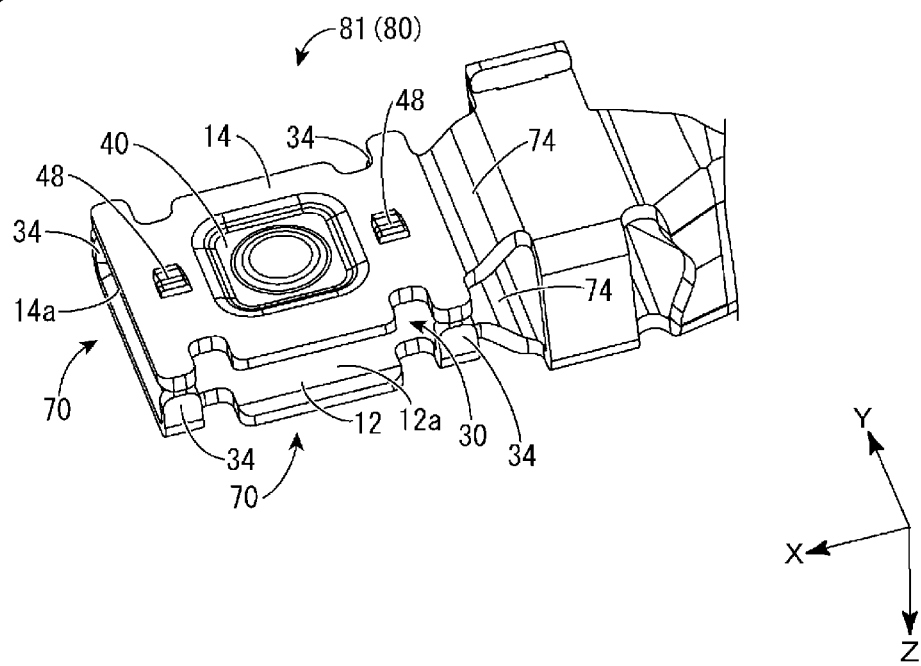
FIG. 9 is a perspective view viewed from a bottom surface of FIG. 8.
Figure 10:
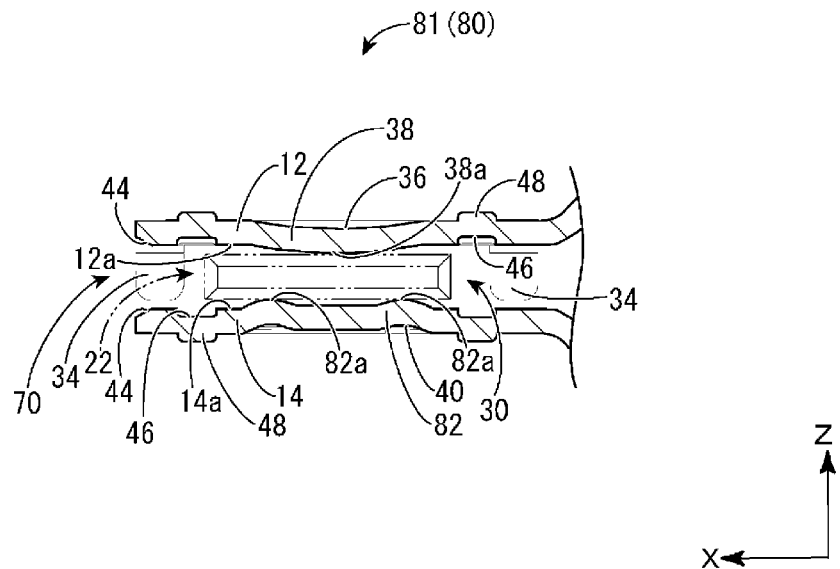
FIG. 10 is a longitudinal section, corresponding to FIG. 5, in a length direction in FIG. 8.

Although the first embodiment and the first modification thereof are described taking as an example a case where the dome-like contact portion 38 projecting toward the second connecting portion 14 is formed on the inner surface 12*a* of the first connecting portion 12 and the trapezoidal contact portion 42 projecting toward the first connecting portion 12 is formed on the inner surface 14*a* of the second connecting portion 14, there is no limitation to this. A second modification of the first embodiment of the present disclosure is described below with reference to FIGS. 8 to 11. Note that since a clip spring 60 similar to the one in the first embodiment and the first modification thereof can be adopted in this modification, the clip spring 60 is not shown. A female terminal fitting 81 constituting a female terminal 80 of the second modification of the first embodiment of the present disclosure shown in FIG. 9 includes a rectangular annular contact portion 82 projecting toward the first connecting portion 12 on the inner surface 14*a* of the second connecting portion 14 by recessing a central part of the trapezoidal contact portion 42 in the first embodiment and the first modification thereof into a dome shape. In this way, a projecting end part of the rectangular annular contact portion 82 is formed to surround a projecting end part 38*a* of the dome-like contact portion 38. Therefore, in a cross-section of the female terminal 80 in the length direction (X direction) shown in FIG. 10, a pair of linear contact portions 82*a*, 82*a* constituted by the projecting end part of the rectangular annular contact portion 82 are arranged on both sides (both sides in the X direction) across the projecting end part 38*a* of the dome-like contact portion 38.

Figure 11:
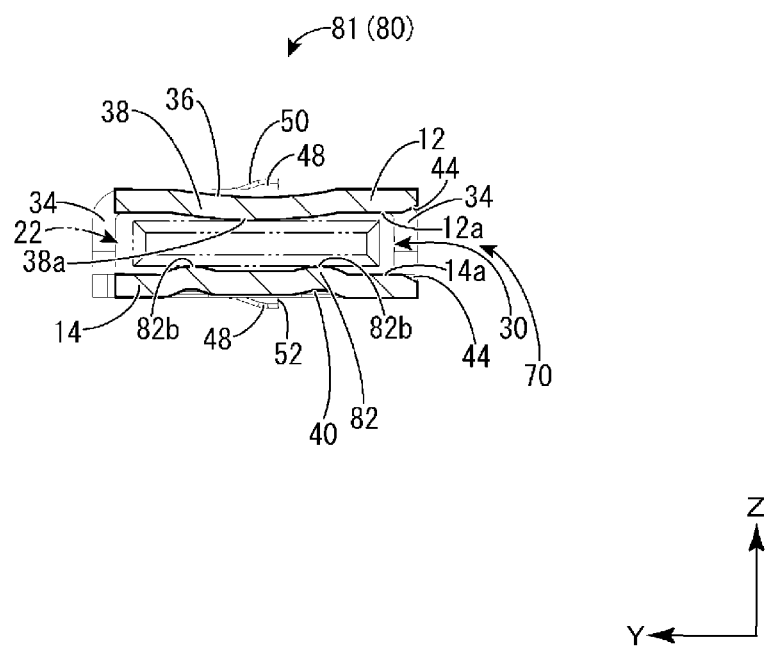
FIG. 11 is a lateral section, corresponding to FIG. 6, in a width direction in FIG. 8.

Further, in a cross-section of the female terminal 80 in the width direction (Y direction) shown in FIG. 11, a pair of linear contact portions 82*b*, 82*b* constituted by the projecting end part of the rectangular annular contact portion 82 are arranged on both sides (in the Y direction) across the projecting end part 38*a* of the dome-like contact portion 38. In this way, in sections shown in FIGS. 10 and 11, the male terminal 22 inserted through the male terminal insertion opening 70 on the front side in the length direction or the male terminal 22 inserted through the male terminal insertion opening 70 on the one side in the width direction is supported on three points from both sides in the plate thickness direction by the projecting end part 38*a* of the dome-like contact portion 38 and the pair of linear contact portions 82*a*, 82*a* or the pair of linear contact portions 82*b*, 82*b*. As a result, a stable contact state between the female terminal 10 and the male terminal 22 can be advantageously maintained by suppressing the rattling of the male terminal 22. Further, by adopting the pairs of linear contact portions 82*a*, 82*a*, 82*b*, 82*b*, insertion resistance of the male terminal 22 into the male terminal insertion gap 30 can be reduced as compared to the trapezoidal contact portion 42 of the first embodiment.

In the female terminal 80 of the second modification of the first embodiment of the present disclosure, the stopper protrusions 34 are formed not only on both sides in the width direction of the tip part of the first connecting portion 12, but also on both sides in the width direction of a base end part of the first connecting portion 12, and project toward the second connecting portion 14. In this way, a distance of the male terminal insertion gap 30 between the first and second connecting portions 12, 14 can be accurate and that state can be stably maintained. The configuration of the stopper protrusions 34 is not limited to those described above, and the stopper protrusions 34 may project from one or both sides in the width directions of the tip part and/or the base end part of each of the first and second connecting portion 12, 14 toward the facing second or first connecting portion 14, 12. If the stopper protrusions 34 are provided on both sides of the first and second connecting portions 12, 14, the mutual contact of the stopper protrusions 34 is included as contact with the other side. Note that the female terminal 80 of the second modification of the first embodiment of the present disclosure apparently has effects similar to those of the female terminal 10 of the first embodiment of the present disclosure since the female terminal 80 differs from the female terminal 10 only in that the rectangular annular contact portion 82 projects toward the first connecting portion 12 from the inner surface 14a of the second connecting portion 14.

Third Modification of First Embodiment

Figure 12:
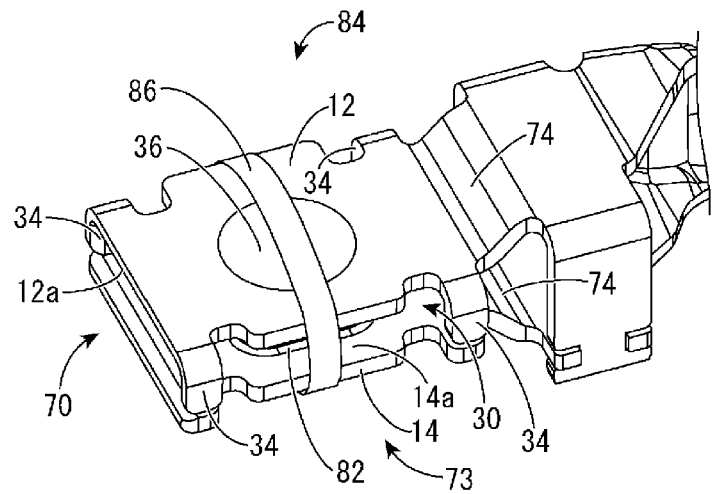
FIG. 12 is a perspective view, corresponding to FIG. 7, showing a female terminal according to a third modification.

Although the first embodiment and the first and second modifications thereof are described taking as an example a case where the first and second connecting portions 12, 14 constituting the pair of connecting portions are biased in the approaching directions by the clip spring 60, which is a spring member, there is no limitation to this. A third modification of the first embodiment of the present disclosure is described below with reference to FIG. 12. In a female terminal 84 of the third modification of the first embodiment of the present disclosure, any of a ring-shaped resilient member 86 such as a rubber band and the like can be adopted as the spring member besides the clip spring 60.

Second Embodiment

Although the above first embodiment is described taking as an example a case where the pair of connecting portions are constituted by the first and second connecting portions 12, 14 arranged to face each other while keeping a fixed distance in the vertical direction, there is no limitation to this. A female terminal 88 of a second embodiment of the present disclosure is described below with reference to FIGS. 13 to 16. A female terminal fitting 90 constituting the female terminal 88 of the second embodiment is formed by press-stamping a strip-like metal flat plate 92 into a predetermined shape and bending the stamped plate piece. A wire connecting portion 54 to be fixed to a core wire of an unillustrated wire by a known arbitrary means such as resistance welding is provided on one end part (right end part in FIGS. 13 to 16) in a length direction of the female terminal fitting 90. On the other hand, a first connecting portion 94 and a second connecting portion 96 constituting a pair of connecting portions are arranged to face each other across a male terminal insertion gap 98 on the other end part (left end part in FIGS. 13 to 16) in the length direction of the female terminal fitting 90.

<First Connecting Portion 94 and Second Connecting Portion 96>

As shown in FIGS. 13 to 16, base end parts 102 are respectively coupled to upper and lower end parts of a connection portion 100 in the form of a rectangular flat plate connected to the wire connecting portion 54 in the first and second connecting portions 94, 96. Tip parts 104 of the first and second connecting portions 94, 96 are respectively folded inwardly from folded portions 106 after extending forward in the length direction from the base end parts 102, and are U-shaped as a whole. Slits 108 are provided to penetrate through the tip parts 104 of the first and second connecting portions 94, 96 over entire lengths in the length direction, and the tip part 104 of each of the first and second connecting portions 94, 96 is divided into two divided connecting portions 110, 110 by the slit 108. That is, the first and second connecting portions 94, 96 constituting the pair of connecting portions are divided into two pairs of divided connecting portions 110, 110. Further, the divided connecting portion 110 is cantilevered from the base end part 102.

Sides of each pair of divided connecting portions 110, 110 closer to tips than the folded portion 106 obliquely extend toward a vertically central side between the first and second connecting portions 94, 96, and extending end parts thereof are bent to be inclined more inwardly. Stopper protrusions 112 are constituted by these extending end parts. That is, each pair of divided connecting portions 110, 110 include the stopper protrusions 112. Further, contact points 116 having a dome shape and caused to project inward by recesses 114 are provided near the folded portions 106 on the sides of each pair of divided connecting portions 110, 110 closer to the tips than the folded portion 106. On the other hand, engaging holes 118 penetrating near the stopper protrusions 112 are provided on the sides of each pair of divided connecting portions 110, 110 closer to the tips than the folded portion 106.

<Clip Spring 120>

As shown in FIGS. 13 to 16, a clip spring 120, which is a spring member for biasing the first and second connecting portions 94, 96 in approaching directions, is mounted in the engaging holes 118 penetrating through the two pairs of divided connecting portions 110, 110 constituting the first and second connecting portions 94, 96. The clip spring 120 is formed, using one of strip plates of various metal materials, which can be press-worked or stamped, such as spring steel, stainless steel, brass, phosphor bronze and beryllium. The clip spring 120 includes a coupling plate portion 62 in the form of a rectangular plate and a pair of sandwiching plate portions 122, 122 in the form of rectangular plates projecting in mutually approaching directions from both side edge parts of the coupling plate portion 62. A slit 124 is provided to penetrate through each sandwiching plate portion 122 over an entire length in a projecting direction, and each sandwiching plate portion 122 is divided into two divided sandwiching plate portions 126, 126 by the slit 124. As a result, the clip spring 120 is configured such that two pairs of divided sandwiching plate portions 126, 126 are cantilevered from the coupling plate portion 62 and arranged to face each other in the vertical direction. Further, the clip spring 120 includes the coupling plate portion 62 for coupling base end parts of the two pairs of divided sandwiching plate portions 126. In this way, the clip spring 120 can be handled as an integrated object, and workability in mounting the clip spring 120 on the first and second connecting portions 94, 96 can be improved. Further, the number of components of the clip spring 120 can be reduced. Further, hook-like engaging projections 128 project on extending end parts of the divided sandwiching plate portions 126. A gap between the engaging projections 128 closest in the vertical direction in the projecting end parts of the divided sandwiching plate portion 126 serves as an insertion opening 130 (see FIG. 16).

Assembling Method of Female Terminal 88 of Second Embodiment

Figure 13:
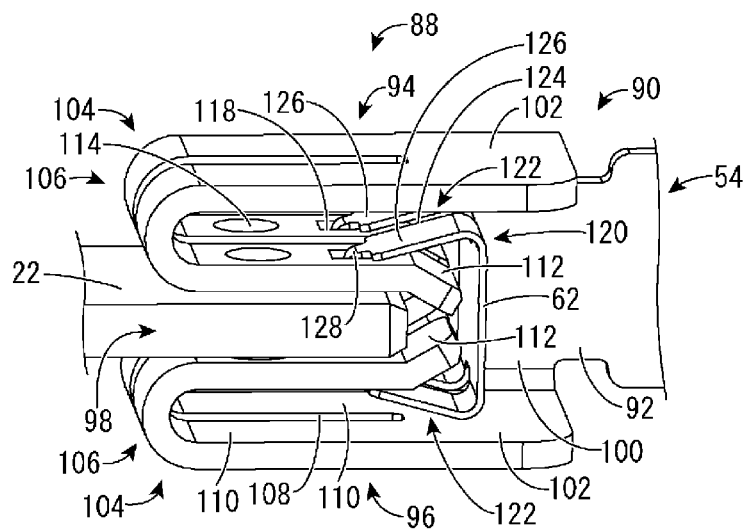
FIG. 13 is an overall perspective view showing a female terminal according to a second embodiment in a state where a male terminal is inserted.
Figure 14:
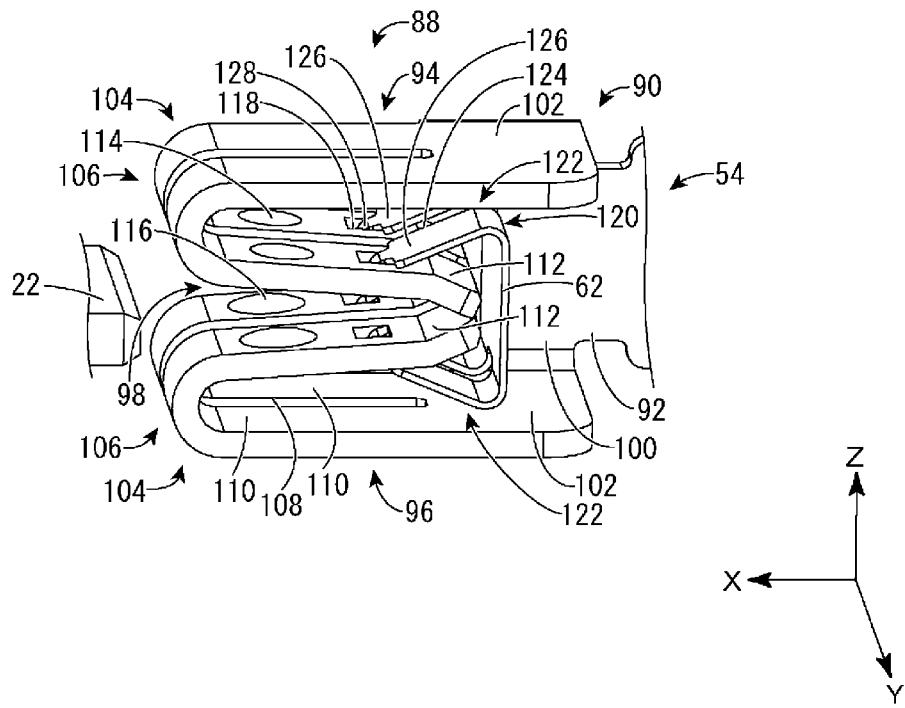
FIG. 14 is an overall perspective view of the female terminal shown in FIG. 13, showing a state before the male terminal is inserted.
Figure 15:
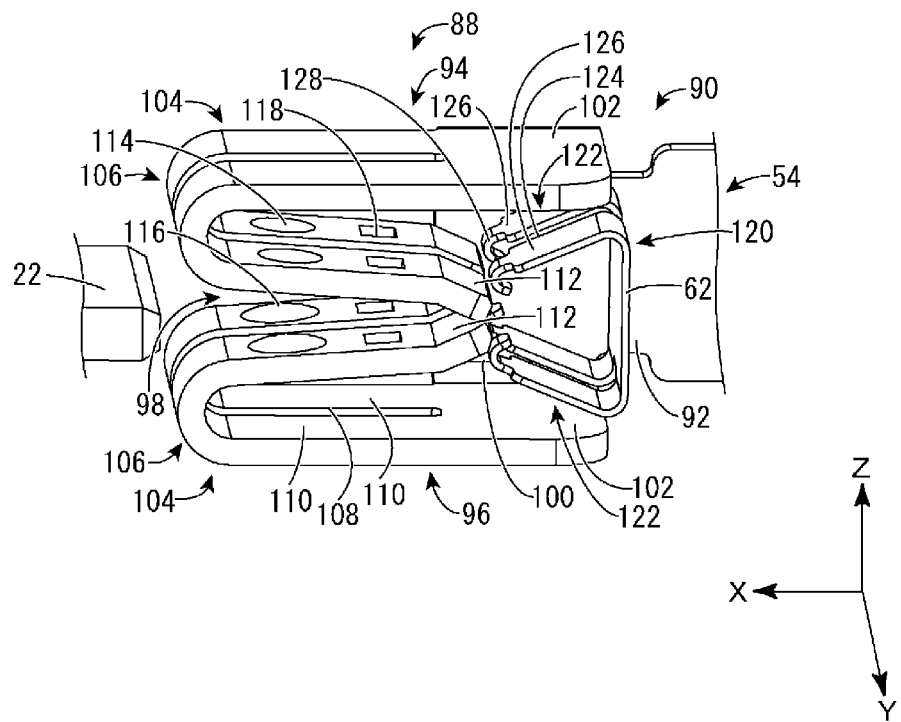
FIG. 15 is an exploded perspective view of the female terminal shown in FIG. 14.
Figure 16:
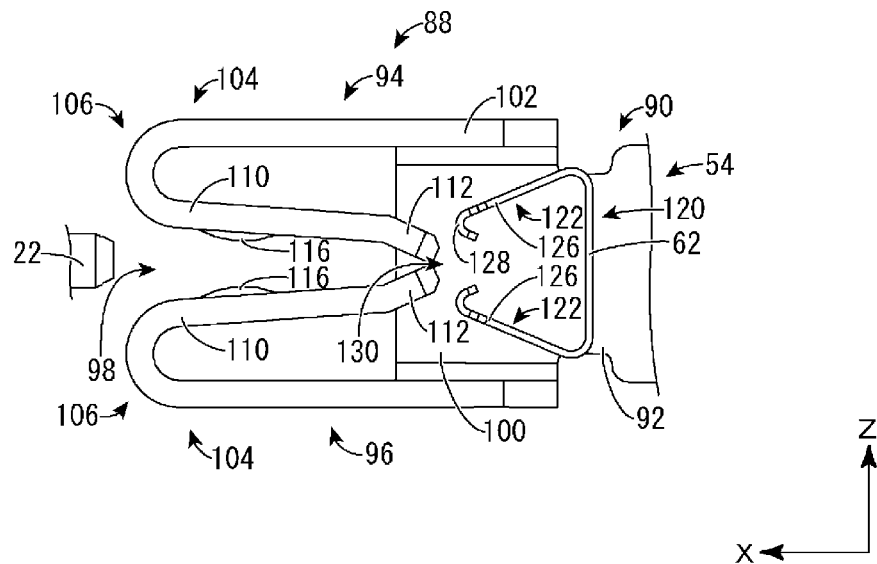
FIG. 16 is a front view of the female terminal shown in FIG. 15.

First, the female terminal fitting 90 is prepared, and the clip spring 120 is inserted from the side of the stopper protrusions 112 (right side in FIGS. 13 to 16) of the first and second connecting portions 94, 96 arranged to face each other. In this way, the two pairs of divided sandwiching plate portions 126, 126 constituting the pair of sandwiching plate portions 122, 122 of the clip spring 120 are resiliently deformed in mutually separating directions. As a result, the insertion opening 130 of the clip spring 120 is widened and the stopper protrusions 112 of the two pairs of divided connecting portions 110, 110 are sandwiched between the two pairs of divided sandwiching plate portions 126, 126 of the clip spring 120. Further, the clip spring 120 is inserted toward the folded portions 106 of the two pairs of divided connecting portions 110, 110. In this way, the two pairs of divided sandwiching plate portions 126, 126 of the clip spring 120 ride over the stopper protrusions 112 and the engaging projections 128 provided on the two pairs of divided sandwiching plate portions 126, 126 are engaged with the engaging holes 118 provided in the two pairs of divided connecting portions 110, 110. As a result, the two pairs of divided connecting portions 110, 110 constituting the first and second connecting portions 94, 96 are sandwiched between the pair of sandwiching plate portions 122, 122 of the clip spring 120. In this way, the clip spring 120 is held on the first and second connecting portions 94, 96 and the female terminal 88 of the second embodiment is completed (see FIG. 14). As a result, the two pairs of divided connecting portions 110 are respectively separately biased by the two pairs of divided sandwiching plate portions 126. Then, as shown in FIG. 13, a male terminal 22 is press-fit into the male terminal insertion gap 98 of the female terminal 88 formed as described above. In this way, the contact points 116 provided on the divided connecting portions 110 are pressed into contact with the male terminal 22 and the male terminal 22 is stably electrically connected to the first and second connecting portions 94, 96 of the female terminal 88.

The female terminal 88 of the second embodiment differs from the female terminal 10 of the first embodiment only in that each of the tip parts 104 of the first and second connecting portions 94, 96 is divided into two divided connecting portions 110, 110 and the sandwiching plate portion 122 is divided into two divided sandwiching plate portions 126. Therefore, effects similar to those of the first embodiment can be apparently achieved.

In addition to that, in the female terminal 88 of the second embodiment, the first and second connecting portions 94, 96 constituting the pair of connecting portions are divided into the two pairs of divided connecting portions 110, 110 and each of the two pairs of divided connecting portions 110, 110 are respectively separately biased by each of the two pairs of divided sandwiching plate portions 126, 126. In this way, each pair of divided connecting portions 110, 110 are displaceable independently of the other pair of divided connecting portions 110, 110. Thus, the two pairs of divided connecting portions 110, 110 constituting the pair of connecting portions can exhibit better followability for the twist of the male terminal 22 inserted into the female terminal 88 of the second embodiment. Accordingly, even if the male terminal 22 is twisted, the female terminal 88 of the second embodiment and the male terminal 22 can be stably electrically connected. Further, since each pair of divided connecting portions 110, 110 include the stopper protrusions 112, an approaching displacement is restricted for each divided connecting portion 110 of each pair. In this way, even if the male terminal 22 is twisted, the female terminal 88 of the second embodiment and the male terminal 22 can be stably electrically connected.

Third Embodiment

Figure 17:
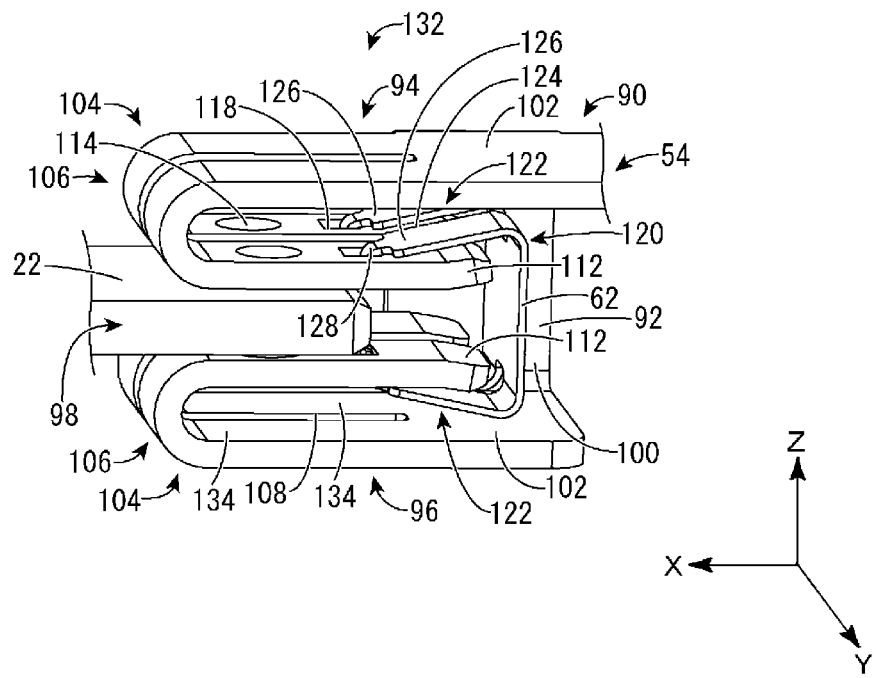
FIG. 17 is an overall perspective view showing a female terminal according to a third embodiment in a state where a male terminal is inserted.
Figure 18:
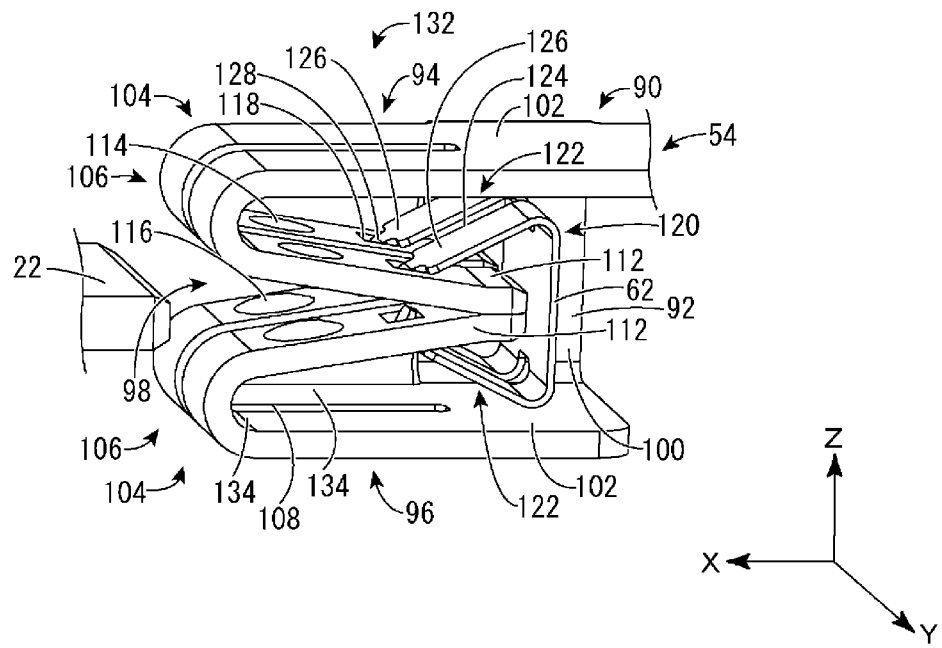
FIG. 18 is an overall perspective view of the female terminal shown in FIG. 17, showing a state before the male terminal is inserted.
Figure 19:
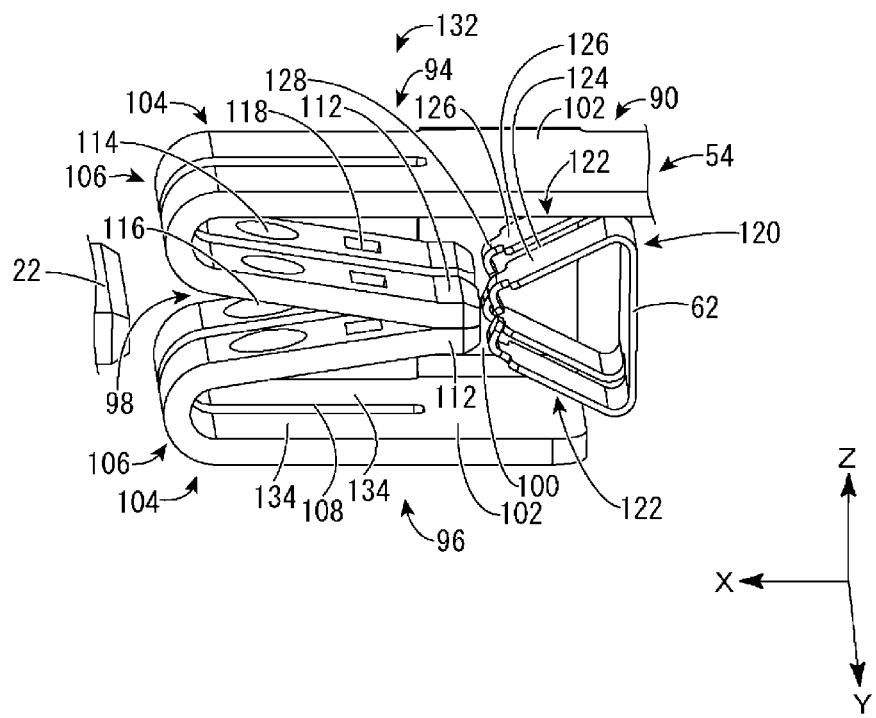
FIG. 19 is an exploded perspective view of the female terminal shown in FIG. 18.
Figure 20:
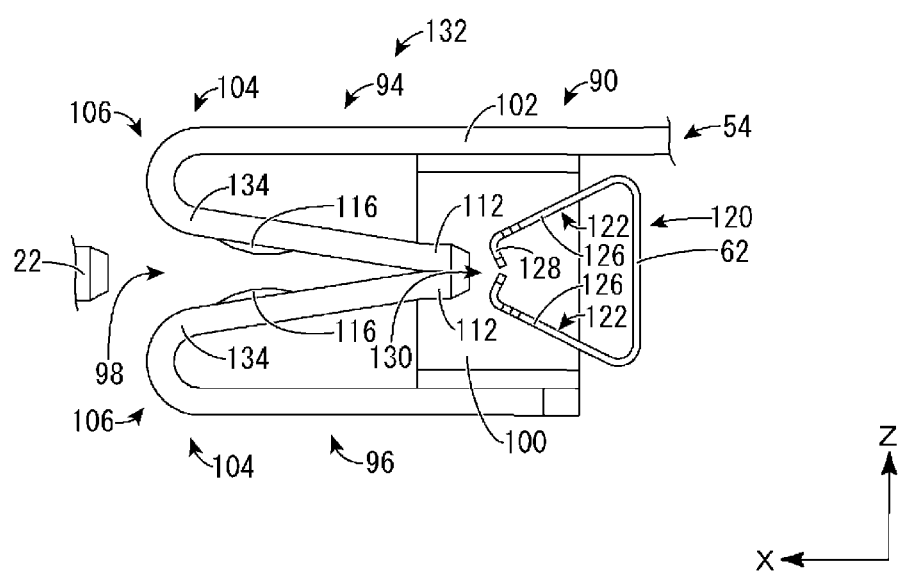
FIG. 20 is a front view of the female terminal shown in FIG. 19.

Although the second embodiment is described taking as an example a case where the stopper protrusions 112 are formed by bending the extending end parts on the sides of the divided connecting portions 110, 110 closer to the tips than the folded portions 106 to be inclined more inwardly, there is no limitation to this. A female terminal 132 of a third embodiment of the present disclosure is described below with reference to FIGS. 17 to 20. In the female terminal 132 of the third embodiment, extending end parts on sides of divided connecting portions 134, 134 closer to tips than folded portions 106 extend rearward in the length direction (rightward in FIGS. 16 to 18) to form stopper protrusions 112.

The female terminal 132 of the third embodiment slightly differs from the female terminal 88 of the second embodiment in an extending direction of the stopper protrusions 112. Therefore, effects similar to those of the second embodiment can be apparently achieved. Further, a contact area of the stopper protrusions 112, 112 is larger than in the case of the female terminal 88 of the second embodiment. In this way, the occurrence of positional deviations of the stopper protrusions 112, 112 can be advantageously prevented.

Other Embodiments

The technique described in this specification is not limited to the above described and illustrated embodiments. For example, the following embodiments are also included in the technical scope of the technique described in this specification.

(1) Although the first embodiment and the first and second modifications thereof are described taking as an example a case where the recesses 68 provided in the pair of sandwiching plate portions 64, 64 of the clip spring 60 are fit to the projections 48 of the first and second connecting portions 12, 14 constituting the pair of connecting portions, there is no limitation to this. That is, in the first embodiment and the first and second modifications thereof, projections may be provided on the clip spring 60 and recesses may be provided in the first and second connecting portions.

(2) Although the second embodiment is described taking as an example a case where the first and second connecting portions 94, 96 constituting the pair of connecting portions are divided into the two pairs of connecting portions 110, 110 and the clip spring 120 is divided into the two pairs of divided sandwiching plate portions 126, 126, there is no limitation to this. The pair of connecting portions may be divided into three or more pairs of divided connecting portions and the clip spring may be divided into three or more pairs of divided sandwiching plate portions. Note that the same also applies to the third embodiment.

LIST OF REFERENCE NUMERALS 10 female terminal (first embodiment)
12 first connecting portion
12a inner surface
14 second connecting portion
14a inner surface
16 female terminal fitting
22 male terminal
24 metal flat plate
26 one end part
28 other end part
30 male terminal insertion gap
32 bent portion
34 stopper protrusion
36 recess
38 dome-like contact portion
38a projecting end part 40 recess
42 trapezoidal contact portion
44 tapered surface
46 recess
48 projection
50 tapered surface
52 engaging surface
54 wire connecting portion
56 wire
58 core wire
60 clip spring (spring member)
62 coupling plate portion
64 sandwiching plate portion
66 insertion opening
68 recess
70 male terminal insertion opening
72 female terminal (first modification)
73 female terminal fitting
74 extending plate portion
76 side wall
78 wire crimping portion
80 female terminal (second modification)
81 female terminal fitting
82 rectangular annular contact portion
82a linear contact portion (X direction)
82b linear contact portion (Y direction)
84 female terminal (third modification)
86 ring-shaped resilient member (spring member)
88 female terminal (second embodiment)
90 female terminal fitting
92 metal flat plate
94 first connecting portion
96 second connecting portion
98 male terminal insertion gap
100 connection portion
102 base end part
104 tip part
106 folded portion
108 slit
110 divided connecting portion
112 stopper protrusion
114 recess
116 contact point
118 engaging hole
120 clip spring (spring member)
122 sandwiching plate portion
124 slit
126 divided sandwiching plate portion
128 engaging projection
130 insertion opening
132 female terminal (third embodiment)
134 divided connecting portion

What is claimed is:

1. A female terminal, comprising:
a pair of connecting portions arranged to face each other across a male terminal insertion gap;
a spring member held on the pair of connecting portions while sandwiching the pair of connecting portions, the spring member biasing the pair of connecting portions in mutually approaching directions along a facing direction; and
a stopper protrusion projecting on at least one of the pair of connecting portions, the stopper protrusion coming into contact with the other of the pair of connecting portions to hold the male terminal insertion gap by restricting displacements of the pair of connecting portions in the approaching directions,
wherein:
displacements in separating directions of the pair of connecting portions are allowed against a biasing force of the spring member, whereby a male terminal is press-fit into the male terminal insertion gap and disposed between the pair of connecting portions,
the spring member is constituted by a clip spring including a coupling plate portion in the form of a rectangular flat plate and a pair of sandwiching plate portions in the form of rectangular flat plates projecting in mutually approaching directions from both side edge parts of the coupling plate portion and the pair of connecting portions are sandwiched between the pair of sandwiching plate portions of the clip spring, and
male terminal insertion openings communicating with the male terminal insertion gap are provided at two positions on a side facing the coupling plate portion of the clip spring and on the side of side edge parts of the pair of sandwiching plate portions of the clip spring.

2. The female terminal of claim 1, wherein projections provided on at least one of each sandwiching plate portion and each connecting portion are fit to recesses provided in the others, whereby the clip spring is held on the pair of connecting portions.

3. The female terminal of claim 1, comprising a dome-like contact portion provided on a facing surface of one of the pair of connecting portions and projecting toward the other connecting portion and a pair of linear contact portions provided on a facing surface of the other of the pair of connecting portions and projecting toward the one connecting portion, the pair of linear contact portions being arranged on both sides across the dome-like contact portion.

* * * * *